United States Patent
Chen et al.

(10) Patent No.: US 10,078,229 B2
(45) Date of Patent: Sep. 18, 2018

(54) SPECKLE REDUCTION APPARATUS BASED ON MIE SCATTERING, PERTURBATION DRIVE, AND OPTICAL REFLECTIVE CHAMBER

(75) Inventors: Xuyuan Chen, Taiyuan (CN); Wenhong Gao, Taiyuan (CN); Yunbo Shi, Taiyuan (CN); Meifang Xu, Taiyuan (CN)

(73) Assignee: NORTH UNIVERSITY OF CHINA, Taiyuan (CN)

( * ) Notice: Subject to any disclaimer, the term of this patent is extended or adjusted under 35 U.S.C. 154(b) by 51 days.

(21) Appl. No.: 13/982,023

(22) PCT Filed: Jan. 10, 2012

(86) PCT No.: PCT/CN2012/000044
§ 371 (c)(1),
(2), (4) Date: Jul. 26, 2013

(87) PCT Pub. No.: WO2012/100645
PCT Pub. Date: Aug. 2, 2012

(65) Prior Publication Data
US 2013/0308195 A1    Nov. 21, 2013

(30) Foreign Application Priority Data
Jan. 29, 2011    (CN) .......................... 2011 1 0031520

(51) Int. Cl.
*G02B 27/48*    (2006.01)
*G02B 5/02*    (2006.01)
(Continued)

(52) U.S. Cl.
CPC ............ *G02B 27/48* (2013.01); *F21V 7/0091* (2013.01); *G02B 5/02* (2013.01); *G02B 5/0205* (2013.01);
(Continued)

(58) Field of Classification Search
CPC ..................................................... G02B 27/48
(Continued)

(56) References Cited

U.S. PATENT DOCUMENTS

2006/0238743 A1    10/2006    Lizotte et al.
2007/0140616 A1*   6/2007    Sugita ............... G02B 27/0994
                                                                    385/32
(Continued)

FOREIGN PATENT DOCUMENTS

CN    101120284 A    2/2008
CN    101464557 A    6/2009
(Continued)

OTHER PUBLICATIONS

International Search Report PCT/CN2012/000044 [KR ISA] dated Apr. 19, 2012.
(Continued)

*Primary Examiner* — Stephone B Allen
*Assistant Examiner* — Ryan S Dunning
(74) *Attorney, Agent, or Firm* — Daniel J. Chalker; Edwin S. Flores; Chalker Flores, LLP

(57) ABSTRACT

A speckle reduction apparatus (300) based on Mie scattering and perturbation drive is disclosed. The speckle reduction apparatus (300) comprises an optical reflective chamber (302) having an incident-light coupling device (301) and an exiting face (303) disposed thereon, and an optical device (308) which faces the incident-light coupling device (301) of the optical reflective chamber (302). The inner walls of the optical reflective chamber (302), except for the wall of light transparent exiting face (303), are mirror surfaces. The optical reflective chamber (302) is fully filled with transparent material (401) having medium particles (402) dispersed therein, which are able to induce Mie scattering of the incident laser. Either or both of the optical reflective cham-
(Continued)

ber (302) and the optical device (308) are provided with a perturbation-sensitive device. The present invention may be implemented with reasonable and compact structure, achieving the following effects: low cost, effective speckle reduction, high laser efficiency, stability, safety, and uniform light intensity.

7 Claims, 3 Drawing Sheets

(51) Int. Cl.
    *F21V 7/00*     (2006.01)
    *G02F 1/1335*     (2006.01)
    *G03H 1/32*     (2006.01)

(52) U.S. Cl.
    CPC .......... *G02B 5/0236* (2013.01); *G02B 5/0242* (2013.01); *G02F 1/133606* (2013.01); *G03H 1/32* (2013.01)

(58) Field of Classification Search
    USPC .................................................. 359/599, 601
    See application file for complete search history.

(56) References Cited

U.S. PATENT DOCUMENTS

| | | | | |
|---|---|---|---|---|
| 2007/0201800 A1* | 8/2007 | Shin | ........................ | G02B 6/04 385/115 |
| 2008/0043490 A1* | 2/2008 | Coleman et al. | ............. | 362/623 |
| 2009/0103328 A1* | 4/2009 | Iwasaki | ................. | G02B 6/0041 362/617 |
| 2009/0128918 A1* | 5/2009 | Abu-Ageel | .................... | 359/602 |
| 2009/0147537 A1* | 6/2009 | Iwasaki | ................ | G02B 6/0021 362/620 |
| 2011/0199686 A1* | 8/2011 | Fujisawa | .............. | G02B 5/0242 359/599 |

FOREIGN PATENT DOCUMENTS

| | | | | |
|---|---|---|---|---|
| CN | 201285473 Y | 8/2009 | | |
| CN | 101529288 A | 9/2009 | | |
| CN | 101634752 A | 1/2010 | | |
| CN | 101685181 A | 3/2010 | | |
| CN | 102053383 A | 5/2011 | | |
| CN | 202075498 U | 12/2011 | | |
| JP | 11-218726 | * 10/1999 | ............. | G02B 27/48 |
| JP | WO 2010047089 A1 | * 4/2010 | ........... | G02B 5/0242 |

OTHER PUBLICATIONS

Kim, Young L., et al., "Origin of low-coherence enhanced backscattering," Optics Letters, May 15, 2006 vol. 31, No. 10, pp. 1459-1461.

Riechert, Falko, et al., "Laser speckle reduction via colloidal-dispersion-filled projection screens," Applied Optics Jul. 1, 2009 vol. 48, No. 19, pp. 3742-3749.

\* cited by examiner

SPECKLE REDUCTION APPARATUS BASED ON MIE SCATTERING, PERTURBATION DRIVE, AND OPTICAL REFLECTIVE CHAMBER

FIELD OF THE INVENTION

The present invention relates to the field of display technology having a coherent light source, in particular to a speckle reduction apparatus based on Mie scattering and perturbation (generally, referring to micro-vibration) drive, mainly for the phenomenon of the optical speckles in the laser display technology and the optical instruments.

BACKGROUND OF THE INVENTION

When a screen is illuminated by coherent light such as laser, due to coherence of the laser and optical roughness of the screen surface, speckle noise pattern is observed by observer's eyes, which seriously affects the display quality of the image and covers useful information. Therefore, how to reduce the speckles has been a research hotspot in the fields of optical instruments and display technologies. In view of the current research, many methods used to reduce speckle have been developed, which roughly can be classified as the following: i) Controlling the coherence time of the laser source to reduce speckle, wherein the principle is to generate boiling speckle by adjusting the laser wavelength (or frequency) or by using multiple independent laser source, most solutions which succeed to reduce speckles to meet practical requirements by controlling the laser coherence time are basically based on multiple light sources superimposed; and ii) Controlling the spatial coherence of the laser beams to reduce speckles, wherein the basic principle is to adjust the phase distribution of the primitive lightwave in the laser beam, thereby changing the spatial distribution of the speckle pattern, a plurality of speckle images are superimposed during the integration time of the human eye to obtain an image with uniform light distribution, thus achieving the purpose of reducing speckles. There are many methods to change the spatial distribution of laser beam, such as rotating a diffuser, vibrating a screen or a binary phase diffuser with Hadamard matrix configures, high frequently vibrating an optical fiber and so on. All the above methods require mechanical vibration, even the high-frequency or large amplitude vibration, or require integration of multiple light sources, with the disadvantages of complex structure, easy to damage, high cost not only, but also speckle reduction being ineffective.

There are technical solutions with no mechanical vibration. For example, China Patent No. 200820122639.7 discloses a scattering-based decoherence shimming device, which requires the use of scattering media containing particles having a diameter less than one-tenth of the wavelength of the incident light, in order to achieve Rayleigh scattering of the incident laser. In this patent, the aqueous solution of an inorganic salt or an organic alcohol (such as NaCl, KCl, $KNO_3$ or $ZnSO_4$) is used as the scattering medium. As the aqueous solution of the inorganic salt or the organic alcohol is present in the form of hydrated ions or macromolecules, the dimensions of which are much smaller with respect to the laser wavelength, Rayleigh scattering occurs for the incident laser, which results in incident laser splitting and conducting within the light guide, in order to reduce the coherence of the incident laser to reduce speckles, while taking advantage of light mixing effect of the light guide, performing the uniformity of the split light to shim decoherence. However, in the experiment according to the teachings of the above technical means, at room temperature, 50 mm in length of a light guide filled with a saturated NaCl aqueous solution is used to reduce speckles, and the result is shown in FIG. 1, which illustrates the speckle contrast of 70%, and almost no effect of speckle reduction.

SUMMARY OF THE INVENTION

To overcome the drawbacks in the conventional methods for speckle reduction, such as ineffective, complex structure, easily damaged, high cost and so on, the present invention intends to provide a speckle reduction apparatus based on Mie scattering and perturbation drive.

The present invention is implemented with a speckle reduction apparatus based on Mie scattering and perturbation drive, which comprises: an optical reflective chamber having an incident-light coupling device and an transparent exiting surface disposed thereon, and an optical device for directing the laser incidence into the optical reflective chamber, wherein the optical device is positioned facing the incident-light coupling device of the optical reflective chamber; wherein the inner walls of the optical reflective chamber, except for the wall of light transparent exiting surface, are "mirror" surfaces (i.e., the inner walls having a high reflective property, which can "total-reflect" the incident laser beam into the optical reflective chamber), and the optical reflective chamber is fully filled with transparent materials having medium particles dispersed therein, dimensions of which are able to induce Mie scattering of the incident laser; wherein either or both of the optical reflective chamber and the optical device are provided with a perturbation-sensitive device for sensing the external perturbations and randomly changing the incident states (including the incident angle, incident position, light path, and the like) of the laser beam incident into the optical reflective chamber and the incident-light coupling device. The said external perturbations may be perturbations of environment (e.g. cooling fans in the system), or generated by a specialized device (for example, a piezo-electric vibrational perturbation device).

The perturbation-sensitive device may be readily implemented by the skilled person in the art through various structures, for example, cantilever, micro-spring, or the like.

The optical device may be reflective mirror, scanning micro-mirror, or optical lens.

The transparent material is the transparent solid-state material with no transmission loss for the incident laser, for example, polymer gel, solution including organic or inorganic solution, or sol including aerosol or liquid sol.

In application, as shown in FIG. 4, the beam emitted by a laser source is incident into the transparent material within the optical reflective chamber via the incident-light coupling device on the optical reflective chamber, being subjected to Mie scattering through interacting with the medium particles dispersed in the transparent material (as shown in FIG. 3, while the medium particles 402 are illuminated by the incident laser 101 and thus Mie scattering occurs, the intensity of the scattered light of the incident laser 101 has a wide scattering angular range, mainly concentrated on the forward directions 104, 105 and 106 with above 90% of the light power, and little of portion in the backward 102, which is usually lower than 10% of the light power; the scattered light 105 along the propagating direction of the incident laser has the highest intensity, while the scattered light 103 and 107 along the vertical direction has the lowest, thereby the incident laser, after being scattered by the medium particles 402, is split into a plurality of scattered light beams with different intensities, which expands the distribution of the scattered angle at the same time), and the incident laser is split into a plurality of scattered light beams with different intensities. These scattered beams are either reflected by the inner walls of the optical reflective chamber, or subjected to Mie scattering through re-interacting with the medium particles dispersed in the transparent material, and then split into more scattered beams. After multiple Mie scattering, the light exits from transparent exiting surface of the optical reflective chamber. Due to the arrangement of the perturbation-sensitive device, the optical reflective chamber and the optical device can sense and follow the external perturbations, which in turn causes the continuous changes of the incident states (including the incident angle, incident position, light path, and the like) of the laser beam incident into the optical reflective chamber, such that propagating directions as well as paths of the scattered light of the incident laser in the transparent material at each time will be changed randomly, which finally causes the random changes in the phase-distribution and scattering angle of the scattered light exiting from the transparent exiting surface of the optical reflective chamber. The exiting scattered light at different times will have different distributions of phase and scattering angle, which is projected and generates a new speckle image. These new and independent speckle images will be superposed during the integration time of human eye (i.e., 50 ms). As a result, an image having an optical energy distributed uniformly is obtained, and thus the speckle reduction may be accomplished.

Compared with the conventional technologies, an optical reflective chamber having transparent material provided therein is used in the present invention. Medium particles dispersed in the transparent material may induce Mie scattering of an incident laser and then the scattered light is split. The present invention further provides a perturbation-sensitive device, so that the external perturbations may cause the continuous changes of the incident states of the laser beam incident into the optical reflective chamber, and propagating directions as well as paths of the scattered light beams in the optical reflective chamber will be changed randomly. As a result, the spatial coherence of the incident laser may be reduced and the exiting scattered light from the exiting face of the optical reflective chamber are with different distributions of phase and scattering angle at different time, which is projected and generates the spatial distribution of a speckle image changing randomly. A plurality of speckle images may be superposed during integration time of human eye, which results in an image with uniform distribution of optical energy, and thus the speckles may be reduced effectively. By the experiments, the speckle contrast of the image may be lower than 4% with application of the apparatus of the present invention. As shown in FIG. 5, the speckle contrast of the image is 3.98%, which exhibits an extremely good speckle reduction. And, the external micrometer-scale perturbations are sufficient to trigger the perturbation-sensitive device. For example, vibrations from a fan of a general projector may meet the requirement of the perturbation magnitude and frequency to trigger the perturbation-sensitive device. Moreover, the effect of speckle reduction may be improved by increasing the intensities of the external perturbations or the concentration of the medium particles in the transparent material. In the present invention, the incident laser is "total-reflected" in the optical reflective chamber, and thus the total loss of the optical energy is minimized, so that a high efficiency of laser power is ensured and uniformity of the light is achieved during the process of "total-reflection". In addition, the optical reflective chamber used in the present invention is common-designed without particular material required for the transparent material, and therefore it possesses the advantage of low cost.

The present invention may be implemented with reasonable and compact structure, achieving the following effects: low cost, effective speckle reduction, high laser efficiency, stability, safety, and uniform light intensity.

DENOTATION OF ACCOMPANYING DRAWINGS

Figure 1:
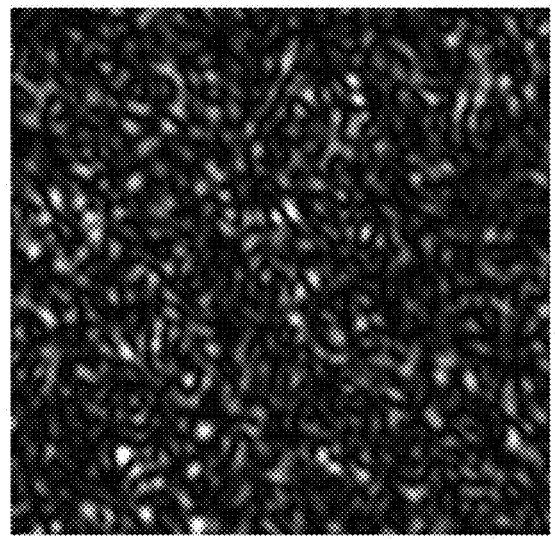
FIG. 1 is an image showing the test result obtained by using conventional speckle reduction technology.

101—incident laser
102, 103, 104, 105, 106, 107—scattered light
300—speckle reduction apparatus
301—incident-light coupling device
302—optical reflective chamber
303—transparent exiting face
304—incident-light aperture
305, 306, 307—speckle reduction apparatus
308—optical device
401—solution or sol
402—medium particle
501, 502, 503—laser
504, 505, 506—mirror
601, 602, 603—signal source
700—lens
701—relay lens
702—optical modulator DLP
703—TIR prism
704—relay lens
705—TIR prism
706—optical modulator DLP
707—relay lens
708—plane mirror
709—TIR prism
710—optical modulator DLP
711—prism
712—scanning micro-mirror
800—screen

BEST EMBODIMENTS OF THE PRESENT INVENTION

Figure 2:
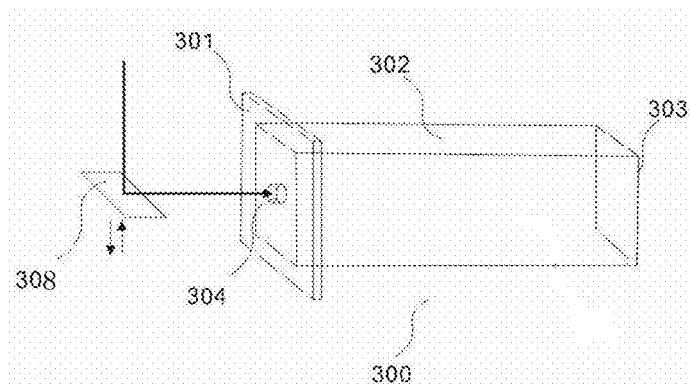
FIG. 2 shows a schematic diagram of structure according to the present invention.
Figure 3:
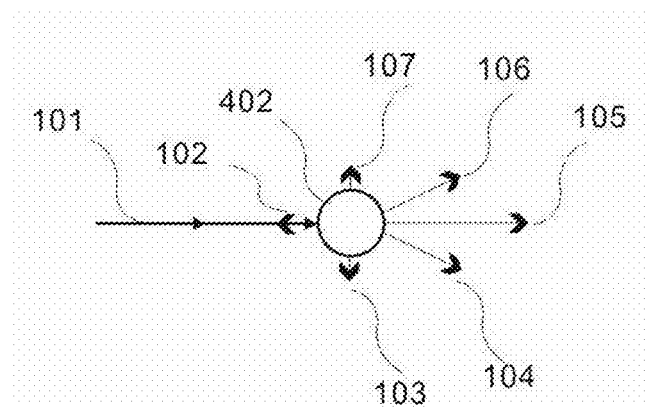
FIG. 3 shows a view of the angular distribution of the light intensity from Mie scattering.
Figure 4:
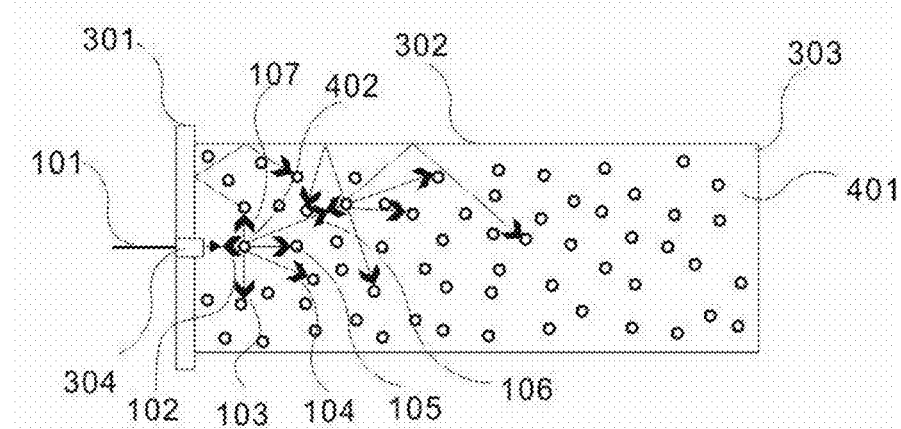
FIG. 4 shows a schematic diagram of the transmission state of the light beam in the apparatus according to the present invention.
Figure 5:
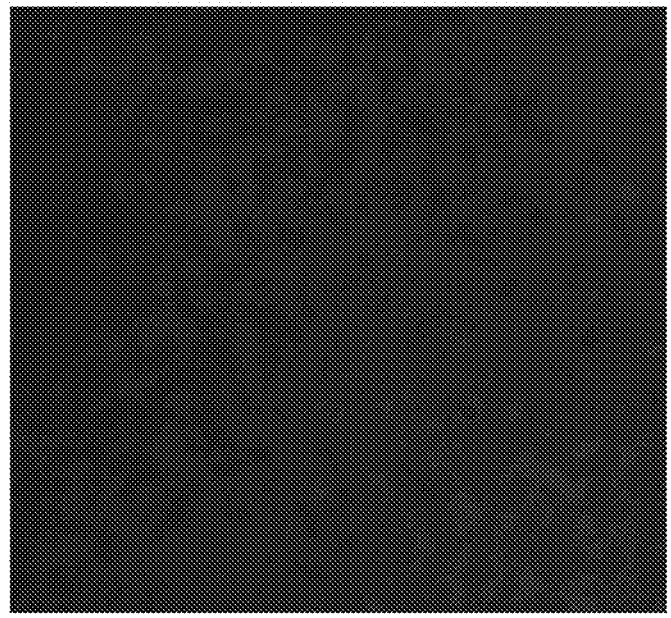
FIG. 5 shows an image obtained by using the speckle reduction apparatus according to the present invention.

As shown in FIG. 2, a speckle reduction apparatus based on Mie scattering and perturbation drive comprises an optical reflective chamber 302 having an incident-light coupling device 301 and a light transparent exiting face 303 disposed thereon, and an optical device 308 for directing the laser incidence into the optical reflective chamber 302, wherein the optical means 308 is facing the incident-light coupling device 301 of the optical reflective chamber 302; wherein the inner walls of the optical reflective chamber 302, except for the wall of light transparent exiting face 303, are "mirror" surfaces (i.e., the inner walls having a high reflective property, which can "total-reflect" the incident laser beam into the optical reflective chamber 302), and the optical reflective chamber 302 is filled fully with transparent material 401 having medium particles 402 dispersed therein, dimensions of which are able to induce Mie scattering of the incident laser; wherein either or both of the optical reflective chamber 302 and the optical device 308 are provided with a perturbation-sensitive device (not shown) for sensing the external perturbations and randomly changing the incident states (including the incident angle, incident position, light path, and the like) of the laser beam incident into the optical reflective chamber 302 and the incident-light coupling device 301.

The perturbation-sensitive device may be readily implemented by the skilled person in the art through various structures, such as cantilever, micro-spring, or the like.

The optical devices 308 may be reflective mirror, scanning micro-mirror, or optical lens.

The transparent material 401 is the transparent solid-state material with no transmission loss for the incident laser, for example, polymeric gel, solution including organic or inorganic solution, or sol including aerosol or liquid sol.

In practice, the medium particles 402 may be polystyrene microspheres or titanium dioxide ($TiO_2$) particles. The optical reflective chamber 302 is generally made of metal, plane mirror, transparent plastics or glass usually in the form of tubular cavity; although no specific limitation is required for the shape. The surface of the light transparent exiting face 303 of optical reflective chamber 302 is generally made of transparent plastics or glass, in most case being a rectangular or round plane, on which an anti-reflection film adapting for the waveband of the incident laser is provided.

The incident-light coupling device 301 on the optical reflective chamber 302 may be implemented as following: providing a light transparent incidence face on which an anti-reflection film adapting for the waveband of the incident laser is provided; or providing an incident-light aperture, and in case the transparent material 401 within the optical reflective chamber 302 is solution or sol, an optical coupling element such as lens is required at the incident-light aperture 304 so that an enclosed optical reflective chamber is formed.

Figure 6:
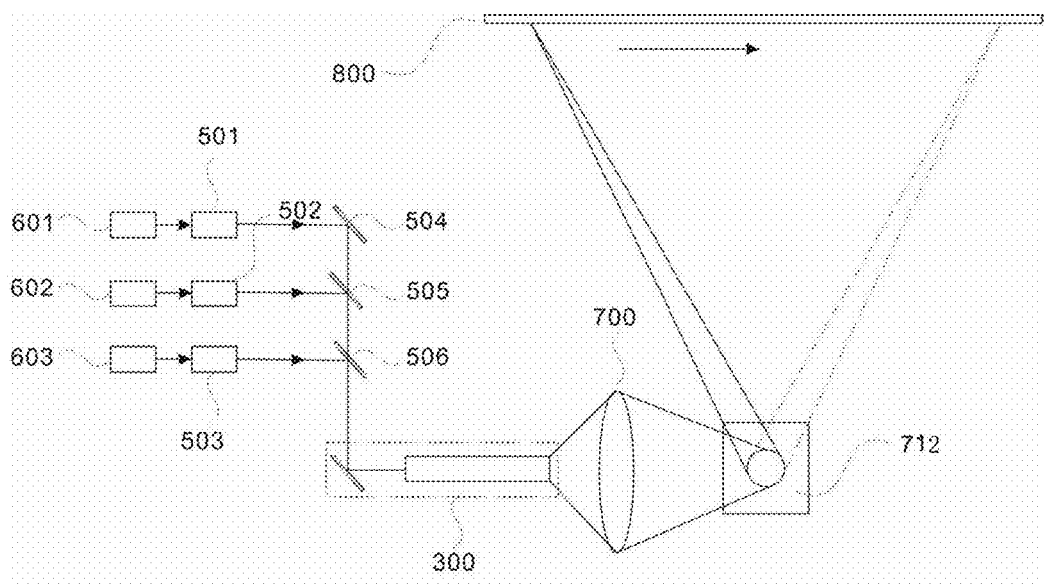
FIG. 6 shows a schematic diagram of the apparatus applied to a raster-scanned display system according to the present invention.

According to the present invention, the speckle reduction apparatus is applicable to the technology of laser projection display, such as the raster-scanned display system shown in FIG. 6. In the system as shown in FIG. 6, the powers output from the tricolor lasers 501, 502 and 503 are modulated by the signal sources 601, 602 and 603 based on the information on each pixel on a two-dimensional image, and three incident laser beams are respectively coupled and entered into the speckle reduction apparatus 300 through mirrors 504, 505 and 506 according to the present invention. The modulated laser beams emit from the exiting face and are projected onto the screen 800 via a lens 700 and a scanning micro-mirror 701. The two-dimensional image is scanned onto the screen by the scanning micro-mirror 701 pixel by pixel, under the control of electric signals. The present embodiment is applicable to the raster-scanned laser projector and laser television display.

Figure 7:
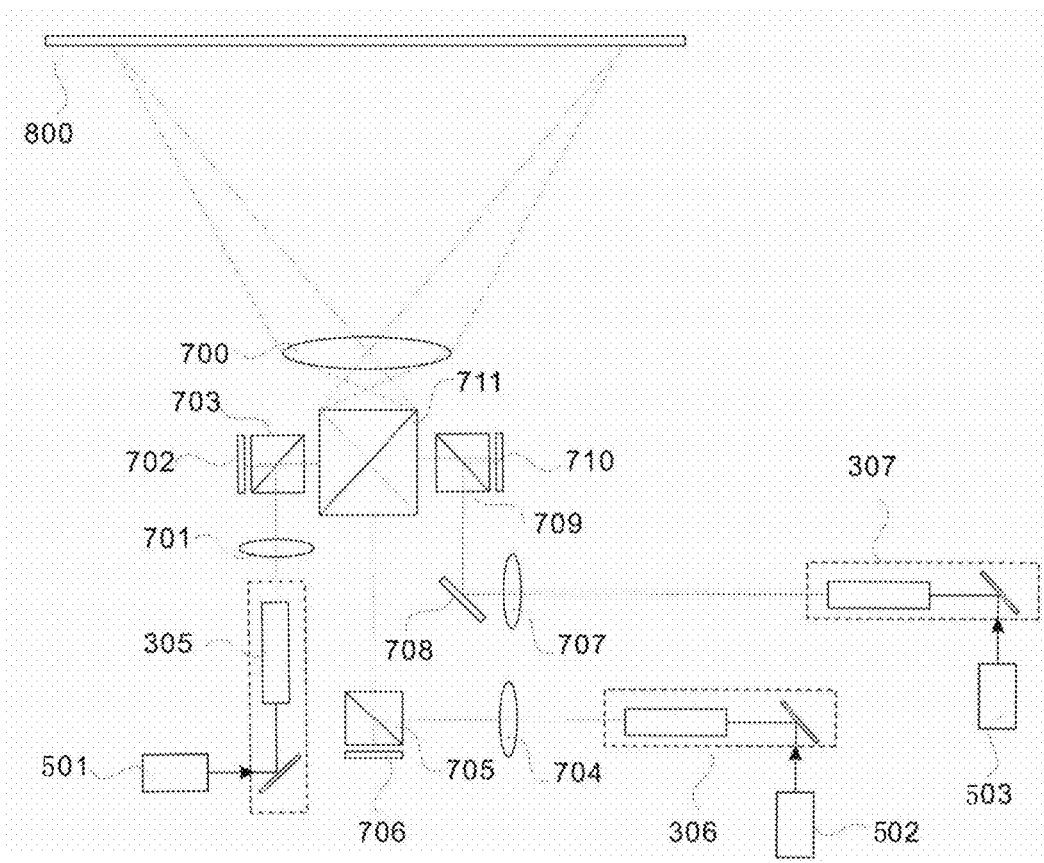
FIG. 7 shows a schematic diagram of the apparatus applied to a full-frame display system according to the present invention.

As shown in FIG. 7, in the full-frame display projection system, the tricolor lasers 501, 502 and 503 output laser beams with constant powers, and the laser beams are coupled and entered into the speckle reduction apparatus 305, 306 and 307 according to the present invention. The modulated laser is converged to optical modulator DLPs 702, 706 and 710 via relay lenses 701, 704 and 707, plane mirror 708, and TIR prisms 703, 705 and 709. The optical modulator DLPs 702, 706 and 710 generate monochromatic images based on the information of the two-dimensional image per frame. The tricolor images are mixed in lens 711, and projected onto the screen 800 via lens 700. The present embodiment is applicable to the laser projector and laser television display based on light modulator such as DMD, LCOS, or the like.

What is claimed:

1. A speckle reduction apparatus based on Mie scattering and perturbation drive, characterized in that the said apparatus comprises:
   an optical reflective chamber (302) having an incident-light coupling device (301) and an light transparent exiting face (303) disposed thereon, and an optical device (308) for directing an incident laser into the optical reflective chamber (302), wherein the optical device (308) is positioned before the optical reflective chamber (302) and facing the incident-light coupling device (301) of the optical reflective chamber (302);
   wherein the inner walls of the optical reflective chamber (302), except for the wall of light transparent exiting face (303), have a high reflective property, and the optical reflective chamber (302) is fully filled with transparent material (401) having medium particles (402) dispersed therein, dimensions of which are able to induce Mie scattering of the incident laser, such that a total reflection and multiple Mie scattering occur within the optical reflective chamber (302); and
   wherein a perturbation-sensitive device is coupled to the optical device (308), the optical reflective chamber (302) or both, and the perturbation-sensitive device senses external perturbations and randomly changes the incident states of the incident laser in response to the sensed external perturbations by moving the optical device (308), the optical reflective chamber (302) or both.

2. The speckle reduction apparatus based on Mie scattering and perturbation drive according to claim 1, characterized in that the optical device (308) is reflective mirror, scanning micro-mirror, or optical lens.

3. The speckle reduction apparatus based on Mie scattering and perturbation drive according to claim 1, characterized in that the transparent material (401) is a transparent solid-state material with no transmission loss for the incident laser.

4. The speckle reduction apparatus based on Mie scattering and perturbation drive according to claim 1, characterized in that the transparent material (401) is solution including organic or inorganic solution, or sol including aerosol or liquid sol.

5. The speckle reduction apparatus based on Mie scattering and perturbation drive according to claim 1, characterized in that the medium particles (402) are polystyrene microspheres or titanium dioxide particles.

6. The speckle reduction apparatus based on Mie scattering and perturbation drive according to claim 1, characterized in that an anti-reflection film adapting for the waveband of the incident laser is provided on the surface of the light transparent exiting face (303) of the optical reflective chamber (302).

7. The speckle reduction apparatus based on Mie scattering and perturbation drive according to claim 1, characterized in that the incident-light coupling device (301) comprises a light transparent incidence face having an anti-reflection film adapted for the waveband of the incident laser, or an incident-light aperture (304) having an optical coupling element disposed therein.

* * * * *